United States Patent [19]

Halvin

[11] Patent Number: 4,541,162
[45] Date of Patent: Sep. 17, 1985

[54] METHOD FOR WHEEL ALIGNMENT

[76] Inventor: Stanley Halvin, 5869 Cherry Ave., Long Beach, Calif. 90805

[21] Appl. No.: 509,329

[22] Filed: Jun. 30, 1983

[51] Int. Cl.$^4$ .................... B23Q 17/00; G01B 7/30
[52] U.S. Cl. .................................. 29/407; 33/203.18
[58] Field of Search ................... 33/203.18; 29/407; 280/661, 673, 674

[56] References Cited

U.S. PATENT DOCUMENTS

| | | | |
|---|---|---|---|
| 2,831,265 | 4/1958 | Weaver | 33/203.18 |
| 3,956,830 | 5/1976 | MacMillan | 33/203.18 |
| 4,176,463 | 12/1979 | Ringle | 33/203.18 |
| 4,232,880 | 11/1980 | Dickerson et al. | 280/661 |
| 4,252,338 | 2/1981 | Ingalls et al. | 280/661 |

Primary Examiner—Howard N. Goldberg
Assistant Examiner—Steven Nichols

[57] ABSTRACT

A tool is provided for continuously and concurrently monitoring both caster and camber during realignment of wheels on an automotive vehicle. The tool includes a fitting which couples to the spindle for a wheel of an automotive vehicle and a degree gauge mounted on the fitting which is adjustable for horizontal alignment in a plane perpendicular to the spindle. A conventional camber gauge is coupled to the fitting so that camber can be observed on the conventional camber gauge and caster can be observed on the tool of the invention while effectuating realignment of the spindle. The tool of the invention allows caster to be monitored without the necessity of keeping a vehicle on an expensive wheel alignment rack and without the expense of electronic or computerized alignment equipment. By reducing the time required for occupancy of a wheel alignment rack, the wheels of more vehicles can be realigned in a much shorter period of time than has heretofore been possible.

3 Claims, 9 Drawing Figures

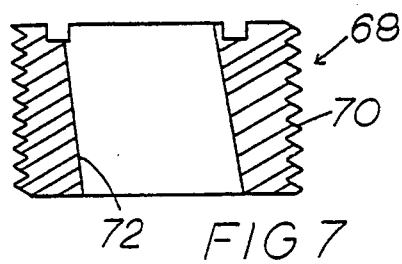
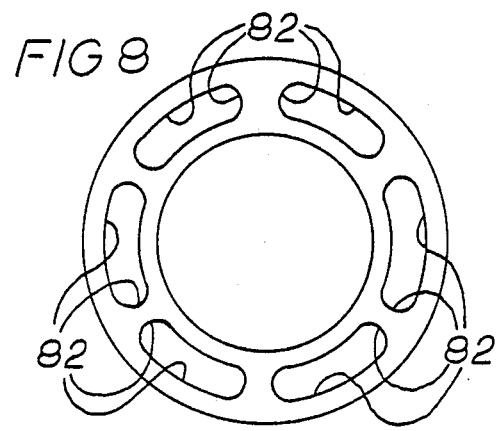
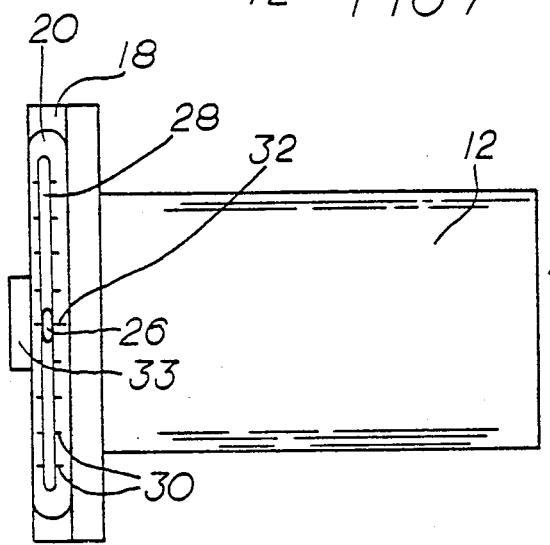
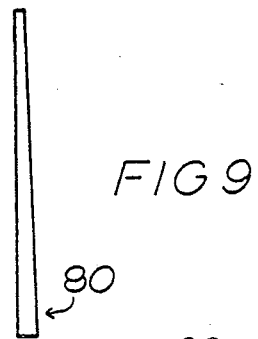
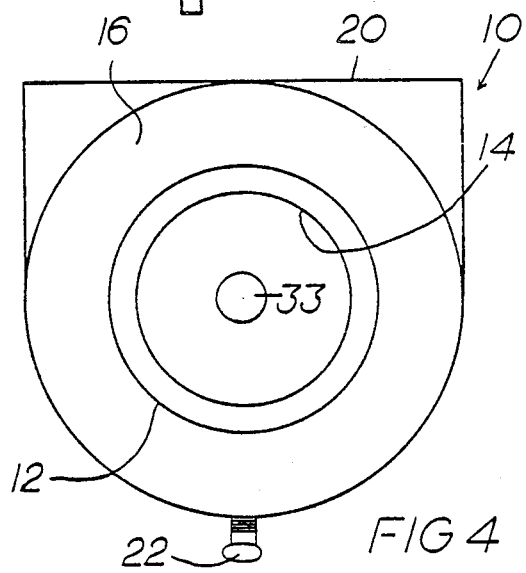
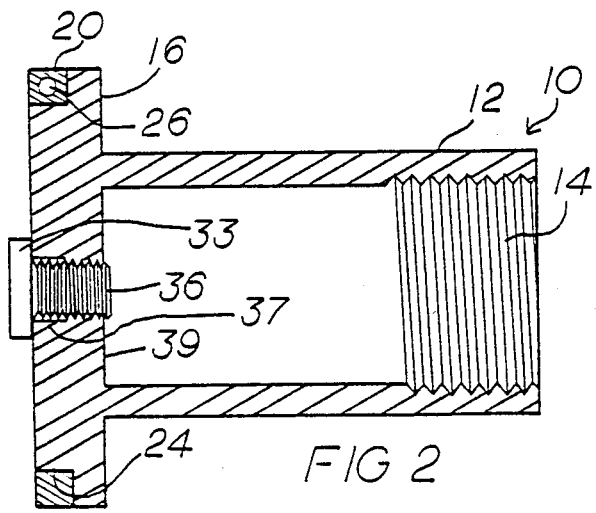

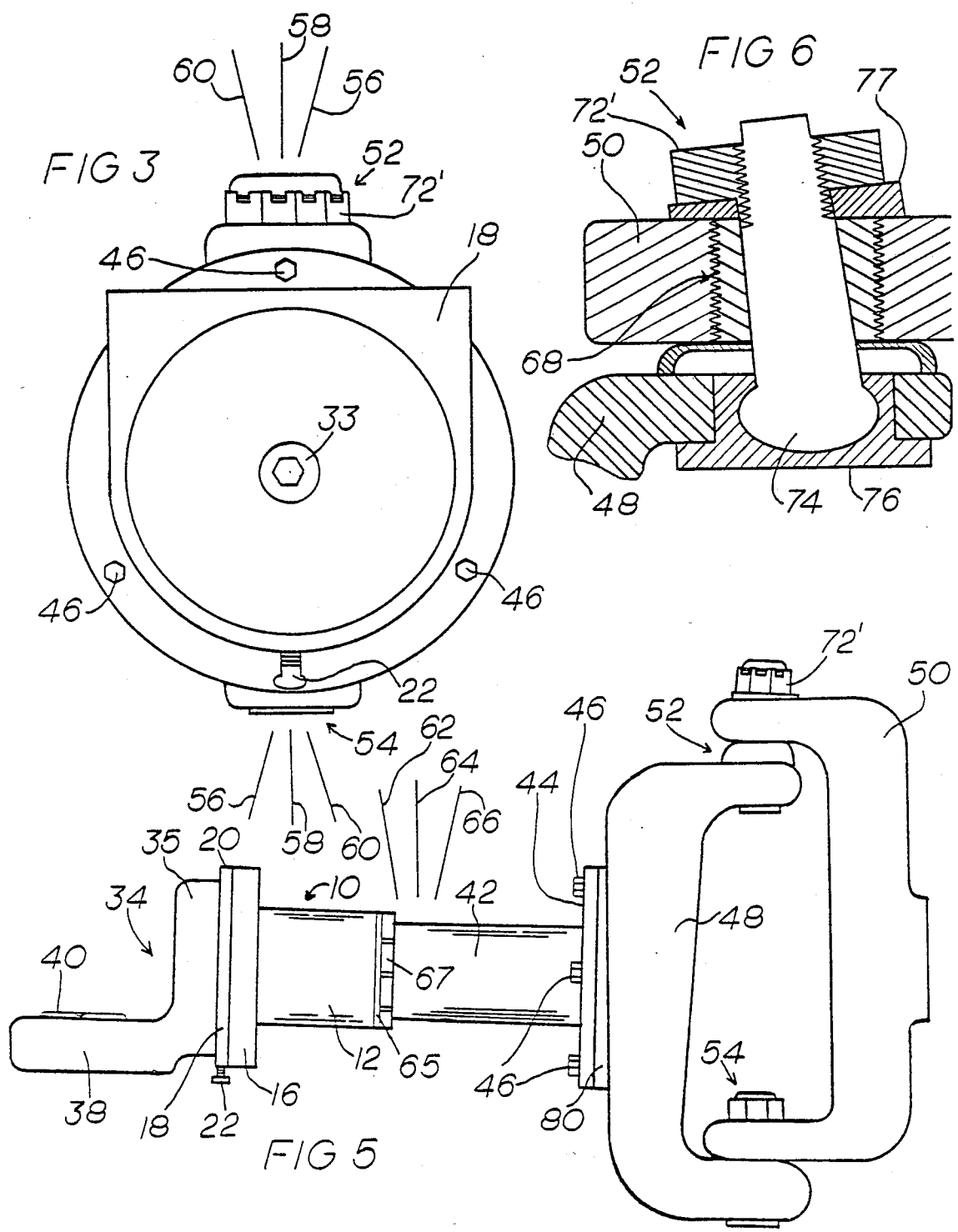

METHOD FOR WHEEL ALIGNMENT

BACKGROUND OF THE INVENTION

1. Field of the Invention

The present invention relates to a tool for use in realigning the wheels of an automotive vehicle, especially four wheel drive vehicles, and a method of realigning the wheels of such vehicles.

2. Description of the Prior Art

With continued or heavy duty use, the wheels of automotive vehicles sometimes become misaligned. Misalignment can occur as a result of wear or bending of the wheel support structures. Axles and spindles sometimes become bent when a vehicle is driven over rough roads or terrain. The ball joints which support the spindle mounting can also wear or become bent. When wheels of a vehicle become misaligned, the vehicle can become difficult to steer and operation of the vehicle can become unsafe. In any event, misalignment inevitably results in excessively rapid and uneven wear on the vehicle tires.

A typical wheel mounting includes a wheel mounted on a spindle which projects outwardly from a generally vertically oriented mounting bracket. In conventional passenger vehicles the mounting bracket, mounting plate and spindle are all formed as a unitary structure. In four wheel drive (4WD) vehicles, on the other hand, the spindle and mounting plate are formed as a unitary structure and are bolted to a mounting bracket. The mounting bracket is equipped with a pair of inwardly directed arms which are hingedly coupled to corresponding mounting arms on another mounting bracket which is stationary relative to the vehicle frame. The stationary and hinged mounting brackets are connected together by a pair of ball joint connections which are nearly vertically aligned. The angular departure of the ball joint connections from perfect vertical alignment in a fore and aft direction relative to the vehicle chassis is called caster. The manufacturer's specification for caster may vary as between different vehicle models, but the prescribed caster is usually within five degrees of perfect vertical alignment.

According to convention, caster of a vehicle wheel is negative if the upper ball joint of a vehicle wheel is forward of the lower ball joint, and positive if the upper ball joint is aft of the lower ball joint.

The other major parameter in which vehicle wheel alignment is measured is termed camber. Camber is the term used to describe the upright orientation of a vehicle wheel measured transversely relative to the vehicle chassis. The camber of a wheel is measured in degrees and is zero degress if the wheel resides in a vertical plane. Camber is negative if the top of the wheel is located inwardly toward the vehicle frame relative to the bottom of the wheel and positive if the top of the vehicle wheel is located outwardly from the bottom of the vehicle wheel relative to the vehicle frame.

Manufacturers specify proper wheel alignment for each model of vehicle manufactured in terms of caster and camber. When misalignment occurs, corrections are performed by first measuring the extent to which the caster and camber of the vehicle wheels depart from the manufacturer's specifications. Steps are then taken to eliminate any caster and camber deviations from specification.

In conventional practice, vehicle wheel realignment is initiated by parking the vehicle so that the wheels rest atop the turntables of a wheel alignment rack. The wheel hubcap and spindle cap are first removed and a conventional camber-caster gauge is positioned against the exposed end of the wheel spindle so that it bears against the wheel hub, the brake drum or rotor assembly.

A conventional camber-caster gauge includes a fitting which is designed to fit in abutting fashion against the exposed end of the rotor, and a pair of parallel degree gauges one for measuring caster and one for measuring camber, both of which extend parallel to the spindle. The two parallel degree gauges are typically bubble gauges. The inclination of the caster gauge relative to a horizontal orientation can be adjusted.

The measurement of camber is performed with the wheel in exact fore and aft alignment, as measured by radial gradations on the base of the alignment rack beneath the turntable. The camber bubble gauge will thereupon be oriented in a generally horizontal disposition in a direction perpendicular to the alignment of the vehicle frame. If the bubble in the bubble gauge rises toward the outboard side of the zero inclination mark of the gauge, a negative camber is indicated. Conversely, if the bubble in the gauge rises toward the inboard end of the gauge, a positive camber is indicated.

The caster bubble gauge is parallel to the camber bubble gauge. Caster is measured by first rotating the wheel on the turntable of the alignment rack so that the spindle is brought 20 degrees to the rear of alignment perpendicular to the orientation of the vehicle frame. The level of the caster bubble gauge is adjusted so that the bubble is precisely at the zero mark on the gauge. The wheel is then turned on the turntable to bring the spindle precisely 20 degrees forward of perpendicular alignment relative to the alignment of the vehicle frame. The extent to which the bubble in the caster gauge departs from the zero mark on the gauge is indicative of the caster measurement for that wheel. That is, a rise of the bubble toward the outboard end of the caster gauge will indicate a positive caster, while a migration of the bubble toward the inboard end of the gauge will indicate a negative caster.

Measurements of caster can only be performed with a sophisticated electronic alignment mechanism, or with a conventional camber-caster gauge attached to the hub, rotor or drum, with the vehicle wheel mounted on the spindle, and with the vehicle resting on a wheel alignment rack. Wheel alignment racks are rather expensive, and most automotive repair establishments capable of performing wheel alignments have a minimum number of wheel alignment racks because of the expense involved. This reduces the rate at which wheel alignments can be performed, since a vehicle remains on the wheel alignment rack, once camber and caster have been measured, for the entire alignment process.

Corrections in wheel alignment are, on four wheel drive vehicles, typically performed by installing eccentrics in the upper ball joint carrying the spindle mounting plate, by installing shims between the spindle base and the spindle mounting plate, or by using a combination of both of these correction techniques. An eccentric is an externally threaded fitting which replaces the original annular, externally threaded fitting in the upper ball joint. Unlike the original fitting, an eccentric has a longitudinal bore which departs slightly from axial alignment. The degree of departure controls the amount of correction of caster and camber which will be achieved.

The eccentric is tightened down in place of the original fitting until a minimum preloading of the ball joint is achieved. Thereafter, continued threadable engagement of the eccentric into the upper ball joint arm will control the alignment of the upper ball joint relative to the lower ball joint both in a direction transverse to the vehicle frame, and in a direction parallel to the orientation of the vehicle frame. In this manner, corrections for both camber and caster can be achieved.

However, according to conventional wheel realignment techniques, it is impossible to continuously monitor both camber and caster while installing an eccentric. This is because caster can only be measured with the wheel on the spindle and with the vehicle on the wheel alignment rack.

Another technique for realigning vehicle wheels involves the installation of a shim. A shim can only be used on those vehicles in which the spindle and spindle base are on a structure separate from the spindle mounting bracket. An annular shim is inserted between the mounting bracket and the spindle base. The annular shim has a wedge shaped cross-section, so as to alter the orientation of the spindle relative to the horizontal. A shim is used only to effectuate corrections for camber by reorienting the spindle alignment relative to the horizontal. Any fore and aft alignment is meaningless because the spindle is constantly moved fore and aft by the vehicle steering wheel when the vehicle is in operation. Nevertheless, a shim can be used in conjunction with an eccentric to provide greater flexibility in adjustments to both camber and caster.

In conventional automotive vehicle wheel alignment, camber and caster are first checked with the vehicle on the wheel alignment rack. The wheels are then removed from the vehicle spindles. The appropriate corrective measures are then taken to attempt to bring the camber and caster back to the manufacturer's specification. That is, an eccentric is installed, a shim is installed, or both an eccentric and a shim are installed on the vehicle wheel mounting. While camber can be monitored during the remedial techniques, caster cannot. Caster can only be checked again once the corrective measures have been completed, the wheels reinstalled on the vehicle, and with the vehicle resting on the wheel alignment rack. If caster has not been corrected sufficiently, the vehicle must again be raised and further corrective measures must be taken. This trial and error process in effectuating wheel realignment results in considerable expense due to the labor charges involved.

SUMMARY OF THE INVENTION

In one broad aspect, the present invention is a tool for monitoring automotive vehicle wheel alignment. The tool of the invention is comprised of a fitting having means for coupling to a wheel spindle and a degree gauge mounted on the fitting and adjustable for horizontal alignment in a plane perpendicular to the spindle. Preferably, the fitting of the tool has threads which are engageable with threads on the protruding end of the spindle. The fitting can thereby be screwed onto the spindle in coaxial alignment therewith. The degree gauge is preferably a bubble gauge.

In another broad aspect, the invention is a method of correcting for misalignment of caster and camber on the wheels of an automotive vehicle. The method according to the invention involves placing the vehicle on an alignment rack and ascertaining the extent of initial misalignment of both caster and camber in the vehicle wheels. The vehicle is then removed from the alignment rack and the frame of the vehicle is elevated to remove the vehicle weight from the vehicle wheels. The vehicle wheels may be removed from the spindles, although wheel removal is not mandatory with the tool of the invention. Thereafter, corrective measures are performed on the vehicle wheel mountings in order to compensate for any departure of camber and caster from the prescribed specifications while continuously and concurrently monitoring caster as well as camber with the vehicle wheels off of the vehicle. It is possible to concurrently monitor caster and camber with the tool of the invention. The tool of the invention is used with a conventional camber-caster gauge, although only the camber degree gauge on the conventional gauge is employed. The first or camber gauge is mounted on the fitting by positioning the conventional gauge against the tool of the invention just as one would position it against the wheel hub, drum or rotor. The second or caster gauge on the tool of the invention is adjusted for horizontal orientation in a plane perpendicular to the spindle. In addition, the tool of the invention can be used to check steering axis inclination.

In one manner of practice of the invention, an eccentric is installed on one of the ball joints which carries the spindle. The eccentric is tightened while concurrently observing both camber and caster on the first and second degree gauges, respectively. The eccentric is tightened until pre-loading of the ball joint is reached. The eccentric is tightened slightly further until it is turned to the proper angular orientation relative to the ball joint in order to optimize camber and caster.

In another manner of practice of the invention, a shim is employed to correct the camber of the wheel. The shim is rotated while monitoring camber with the tool of the invention in combination with a conventional gauge. The shim is tightened at the angular orientation which optimizes camber.

By using the tool of the invention and by practicing the method of the invention, it is possible to realign the wheels of an automotive vehicle far more rapidly than has heretofore been possible. It is possible to complete realignment of a vehicle wheel by resorting to use of a vehicle wheel alignment rack only once in order to obtain initial measurements. This frees the expensive vehicle wheel alignment rack for use in aligning the wheels of other vehicles, thereby allowing a far greater throughput and efficiency of use of the vehicle wheel alignment rack.

The tool and method of the invention also allow both camber and caster to be monitored continuously and concurrently while taking corrective action to realign a vehicle wheel. Unlike the prior art practice, it is unnecessary to resort to trial and error in realigning the wheel of a vehicle. Rather, the camber and caster of the wheel mounting are readily observable throughout the corrective measures which are taken. The invention, therefore, allows vehicle wheel alignment to be completed in a far shorter time than has heretofore been possible.

A further advantage of the tool of the invention is that it is possible to check spindle runout on most four wheel drive vehicles. In some instances, misalignment of a vehicle wheel is not due to any defect in the ball joints or other mountings, but rather is a result of a bent spindle. This is called spindle runout. Spindle runout can be checked according to the invention on vehicle models in which the spindle base is bolted to a mounting bracket by taking the spindle off of the mounting bracket, turning it 180 degrees and to other positions of rotation, as appropriate, and reattaching it to the mounting bracket. If spindle runout has occurred, this will be evident because the readings of camber will differ from the values observed before the 180 degree rotation. Without the tool of the invention, it would not always be possible to detect spindle runout with the wheel off of the spindle.

The invention may be described with greater clarity and particularity by reference to the accompanying drawings.

DESCRIPTION OF THE DRAWINGS

FIG. 1 is a top plan view of a tool according to the invention.

FIG. 2 is a, sectional elevational view of a tool according to the invention.

FIG. 3 is an elevational end view of a tool according to the invention shown in use.

FIG. 4 is an opposite end view of a tool according to the invention.

FIG. 5 illustrates use of the tool of the invention in conjunction with a conventional camber-caster gauge in practicing the method of the invention.

FIG. 6 is a detailed sectional view illustrating the installation of an eccentric in a ball joint.

FIG. 7 is an isolated view of the eccentric employed in FIG. 6.

FIG. 8 is an elevational view of a shim used to correct wheel alignment according to the invention.

FIG. 9 is an edge view of the shim of FIG. 8.

DESCRIPTION OF THE EMBODIMENT AND METHOD

FIGS. 1 and 2 illustrate a tool 10 for monitoring automotive vehicle wheel alignment according to the invention. The tool 10 includes a fitting in the form of an internally threaded, annular barrel 12, the threads of which are threadably engagable with the threads on the end of a spindle so that the barrel 12 may be coupled to a spindle. While different spindles have different thread sizes, the threads 14 on the barrel 12 will fit onto the spindles of quite a number of four wheel drive vehicles if the pitch diameter is one and five-eighths inches and the longitudinal pitch is sixteen threads per inch.

The tool 10 has an annular flange 16 which forms a shoulder to receive a circular gauge mounting ring 18 which in turn carries a level gauge 20. The degree gauge 20 is mounted on the threaded fitting 12 by means of the mounting ring 18 and is adjustable for horizontal alignment in a plane perpendicular to a vehicle spindle. The mounting ring 18 is an annular ring which is rotatably adjustable upon the circular mounting surface 24, as illustrated in FIG. 2, by means of a set screw 22 visible in FIG. 3. The set screw 22 is used to secure the annular mounting ring 18 at a selected orientation on the circular mounting surface 24 upon which the mounting ring 18 resides. The set screw 22 is located at the bottom of the mounting ring 18 so that tightening of the set screw 22 does not cause the orientation of the mounting ring 18 to vary.

As is evident in FIG. 1, the degree gauge 20 is a bubble gauge in which the position of a bubble 26 in liquid contained in a tube 28 is measured relative to graduations 30. Each graduation 30 corresponds to one half a degree of departure of the gauge 20 from a position of precise horizontal alignment indicated by the central graduation 32.

FIG. 5 illustrates use of the tool 10 in conjunction with a conventional camber-caster gauge 34. The camber-caster gauge 34 includes a disc-like hub which has a central positioning pin which fits into an axial recess in the Allen head of a bolt 33. The bolt 33 has a threaded shank 36 which is threadably engaged in a tapped bore 37 through the blind end wall 39 of the tool 10. The purpose of the tapped bore 37 is to allow attachment of additional alignment equipment, such as computerized, electronic and mechanical alignment systems.

The tool 34 has an elongated handle 38 which extends at right angles to the positioning disc 35. The handle 38 carries a longitudinally extending bubble type degree gauge 40. When the tool 34 is positioned so that the positioning disc 35 resides in coaxial alignment with the tool 10 of the invention, the bubble gauge 40 extends parallel to the spindle 42 upon which the tool 10 of the invention is mounted.

The spindle 42 is of the type which has an annular, flange-like base 44 secured by bolts 46 to a C-shaped mounting bracket 48. The C-shaped mounting bracket 48 is hingedly coupled to a stationary, corresponding C-shaped mounting bracket 50 which is secured immovably to the vehicle frame or differential housing. The brackets 48 and 50 are hingedly coupled together by upper and lower ball joints 52 and 54, respectively, or by bearings.

The upper and lower ball joints 52 and 54 are usually within five degrees of vertical alignment, as viewed in FIG. 3, although they are not necessarily precisely vertically aligned in all vehicles. In some vehicles the manufacturer's specifications require a positive caster setting. In such vehicles the proper orientation of the ball joints 52 and 54 would be along the imaginary line indicated at 56, which is inclined slightly to the rear of a perfect vertical line 58, both visible in FIG. 3. In the view of FIG. 3, the front of the vehicle may be considered to be to the left.

Alternatively, some vehicles require a negative caster. In such vehicles, the upper ball joint 52 is located slightly forwardly from the lower ball joint 54 along an imaginary line inclined forwardly, indicated at 60 in FIG. 3. While manufacturer's specifications may vary, almost all vehicles require a caster of no greater than about five degrees, either positive or negative.

Similarly, a vehicle manufacturer will specify the proper camber, which indicates the relative position of the wheel or the spindle 42 upon which the wheel is mounted. In vehicles with a positive camber, wheel alignment will be along an imaginary line 62, which slopes upwardly and outwardly from a precise vertical alignment indicated by the imaginary line 64 in FIG. 5. In the view of FIG. 5, the chassis of the vehicle is to the right and the view is looking toward the front of the vehicle from the rear. In vehicles where the camber is negative, the wheel will be aligned along an imaginary line 66 which slopes upwardly and inwardly in the view of FIG. 5. Like caster, the camber of automotive vehicles will vary slightly, but the desired camber will usually be between about one half degree positive and zero degrees.

In realigning automotive vehicle wheels according to the present invention, correction for misalignment of caster and camber on the vehicle wheels is carried out in the following fashion. The vehicle is first placed on a conventional alignment rack and caster and camber measurements are taken in a conventional manner. The vehicle can thereupon be removed from the wheel alignment rack immediately, thereby freeing the rack for use by other vehicles. The caster and camber measurements taken on the wheel alignment rack are thereupon compared with the manufacturer's prescribed caster and camber specifications. The extent of initial misalignment of both caster and camber in the vehicle wheels is thereby ascertained. One is thus appraised of the extent and directions in which the corrections must be made. For example, if the manufacturer's specifications require a caster of two degrees positive and a camber of zero degrees, and the actual measurements on the wheel alignment rack which are obtained show a caster of two degrees negative and a camber of one degree negative, the corrections which must be made are evident. The caster must be adjusted four degrees positive and the camber must be adjusted one degree positive.

The frame of the vehicle is then elevated to remove the vehicle weight from the vehicle wheels. The camber must then be measured again, as it will change with removal of weight from the vehicle wheels. The correction of one degree positive will be performed relative to the new camber measurement. The vehicle wheels may or may not be removed from the vehicle. At this time, the tool 10 of the invention is screwed onto the exposed threads at the end of the spindle until the end of the tool 10 resides in abutment against the lockwasher 65 and the spindle nut 67. The circular mounting ring 18 is rotated until the bubble gauge 20 is at the top and is horizontally disposed. The orientation of the bubble gauge 20 is adjusted until the bubble 26 is precisely centered on the zero gradation mark 32 depicted in FIG. 1. The set screw 22 is then tightened to prevent the mounting ring 18 from rotating relative to the barrel 12 of the tool 10.

The conventional camber-caster gauge 34 is thereupon engaged with the tool 10 in the manner depicted in FIG. 5. The bubble gauge 40 mounted in the handle 38 is then observed for an inclination relative to the zero gradation mark.

Once the initial camber and caster conditions have been determined, the particular means for effectuating corrections must be selected. As an example, it may appear most desirable to install an eccentric 68, depicted in isolation in FIG. 7, on the upper ball joint 52. The eccentric 68 is externally threaded at 70 to engage with internal threads in a tapped bore through the upper arm of the mounting 50. Unlike the threaded bushing supplied as original equipment with the ball joint 52, depicted in FIG. 5, the eccentric 68 has a bore 72 therethrough which is offset from coaxial alignment with the outer surface of the eccentric 68. The extent of eccentricity of the bore 72 is exaggerated in the drawings for illustrative purposes.

The eccentric is then installed in the manner depicted in detail in FIG. 6. The eccentric 68 is threadably engaged with the tapped bore through the upper arm of the mounting bracket 50 until it bears down on the ball joint socket and ball 74, as illustrated in FIG. 6. The hinge stud 76 which is carried by the upper arm of the mounting bracket 48 extends through the eccentric bore 72 of the eccentric 68. A tapered washer 77 provides a flat bearing surface for the castle nut 72'. Once the eccentric 68 has been tightened down onto the ball joint 74 with the requisite preloading, the bubble gauges 20 and 40 are closely observed to ascertain both the caster and the camber, respectively. The position of relative rotation of the eccentric 68 in the tapped bore in the upper arm of the mounting bracket 50 will vary the orientation of alignment of the ball joints 52 and 54. Accordingly, it is important to observe both caster and camber concurrently once preloading is reached in order to bring caster and camber to an optimum. The optimum, in the example recited, would be achieved when the camber, as measured on the bubble gauge 40, showed a change of positive one degree from its measurement with the vehicle elevated, and the caster, as measured on the bubble gauge 20, showed a positive inclination of two degrees.

As a practical matter, it is sometimes difficult to obtain the precise manufacturer's specified values during a wheel realignment. Nevertheless, the eccentric 68 can almost always be turned to a position at which camber and caster are quite close to their prescribed values. This is the optimum position if further turning of the eccentric 68 causes caster or camber, or both, to depart significantly from their prescribed values.

In some automotive vehicles, wheel misalignment is not caused by misalignment of the ball joints 52 and 54, but rather is caused as a result of spindle runout. That is, the spindle 42, depicted in FIG. 5, may be bent. In four-wheel drive vehicles, the transverse spindle 42 projects outwardly from a base plate 44 that is bolted to a mounting bracket 48.

To ascertain whether spindle runout has occurred, camber and caster are first measured with the tools 34 and 10 in the manner depicted in FIG. 5. The results are recorded and the spindle 42 and the base 44 are then removed from the mounting bracket 48. The spindle and its base are then rotated 180 degrees and again bolted to the mounting bracket 48. If spindle runout exists, the camber measurement will be different when measured again.

Spindle runout can be corrected by the interposition of a shim between the spindle 42 and the base 44 and the mounting bracket 48. A shim is an annular structure indicated at 80 in FIG. 8, having a wedge shaped cross-section as is illustrated in exaggerated fashion in FIG. 5 and in FIG. 9. The shim 80 has elongated, arcuate apertures 82 to receive the bolts 46 and to allow the shim 80 to be positioned at a selected rotational orientation within the restrictions imposed by the arcuate lengths of the apertures 82.

In realigning the vehicle wheels using a shim, the initial measurements of camber and caster are taken in the manner previously prescribed. Once the level gauge 20 has been zeroed, however, the base plate 44 is unbolted from the mounting bracket 48. A shim 80, depicted in isolation in FIGS. 8 and 9, is then positioned between the base plate 44 and the mounting bracket 48. The bolts 46 are then loosely screwed back in. The bolts 46 pass through the arcuate apertures 82 in the shim 80.

With the bolts 46 loosely secured, the spindle 42 and spindle base plate 44 are pressed lightly against the shim 80 and the camber is measured from the bubble gauge 20. The shim 80 is slowly turned to adjust its position while camber on the gauge is closely observed. The elongated nature of the arcuate apertures 82 allows a considerable adjustment in this fashion. Once the camber is as close as possible to the desired adjustment, the bolts 46 are tightened.

Undoubtedly, numerous other variations and modifications of both the tool of the invention and the method of effectuating wheel realignment according to the invention will become readily apparent to those in the field of automotive vehicle wheel realignment. Accordingly, the scope of the invention should not be construed as limited to the specific embodiment and implementations described herein, but rather is defined in the claims appended hereto.

I claim:

1. A method of correcting for misalignment of caster and camber on the wheels of an automotive vehicle comprising:

placing said vehicle on an alignment rack, ascertaining the extent of initial misalignment of both caster and camber in the vehicle wheels, removing said vehicle from said alignment rack, elevating said vehicle frame to remove the vehicle weight from said vehicle wheels, screwing onto a wheel spindle a fitting having annular internally threaded means for coupling to a wheel spindle, a first degree gauge mounted on said fitting and adjustable for horizontal orientation parallel to a wheel spindle, a second degree gauge mounted on an annular ring disposed upon said fitting in rotatable fashion relative thereto and adjustable for horizontal orientation in a plane perpendicular to said spindle, rotation said annular ring relative to said fitting to bring said second degree gauge into a horizontal orientation, securing said annular ring to said fitting to prevent further relative rotation between said ring and said fitting, calculating the desired adjustments to caster and camber to correct for any misalignments in caster and camber, installing an eccentric on a ball joint which carries said spindle, tightening said eccentric until preloading is reached, and tightening said eccentric further while concurrently observing camber and caster on said first and second degree gauges, respectively, until camber and caster are at an optimum with respect to said desired adjustments.

2. A method of correcting for misalignment of caster and camber on the wheels of an automotive vehicle comprising:

placing said vehicle on an alignment rack, ascertaining the extent of initial misalignment of both caster and camber in the vehicle wheels, removing said vehicle from said alignment rack, elevating said vehicle frame to remove the vehicle weight from said vehicle wheels, removing said vehicle wheels from said vehicle, screwing onto said wheel spindle a fitting having annular, internally threaded means for coupling to a wheel spindle, a first degree gauge mounted on said fitting and adjustable for horizontal orientation parallel to a wheel spindle, and a second degree gauge mounted on an annular mounting ring on said fitting and adjustable for hordizontal orientation in a plane perpendicular to said spindle, measuring the camber of said wheel spindle using said first degree gauge while monitoring caster with said second degree gauge.

calculating the desired adjustment to caster and camber which must be performed to correct for any misalignments in caster and camber, interposing a shim between said spindle and the mounting bracket which carries said spindle, and rotatably adjusting said shim while observing camber on said first degree gauge until camber is at an optimum relative to the aforesaid desired adjustment to camber.

3. A method according to claim 2 further comprising removing said spindle from said mounting bracket after measuring the camber of said wheel spindle, rotating said spindle 180 degrees relative to said mounting bracket, reinstalling said spindle on said mounting bracket, remeasuring the camber of said wheel spindle, and comparing the camber measurements prior to and subsequent to the 180 degree rotation and reinstallation of said spindle before interposing said shim between said wheel spindle and said mounting bracket.

* * * * *